L. A. HOERR.
BRAKE MECHANISM.
APPLICATION FILED DEC. 18, 1913.

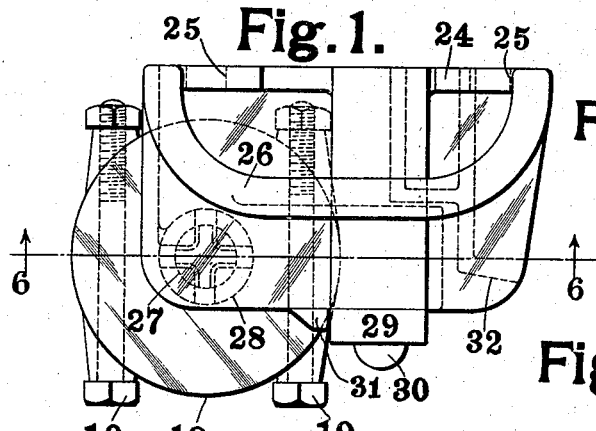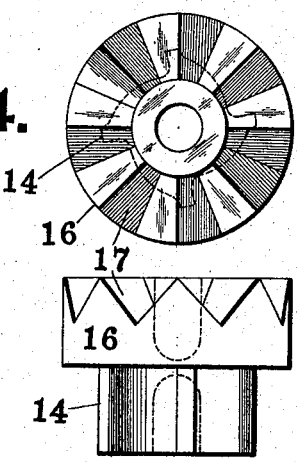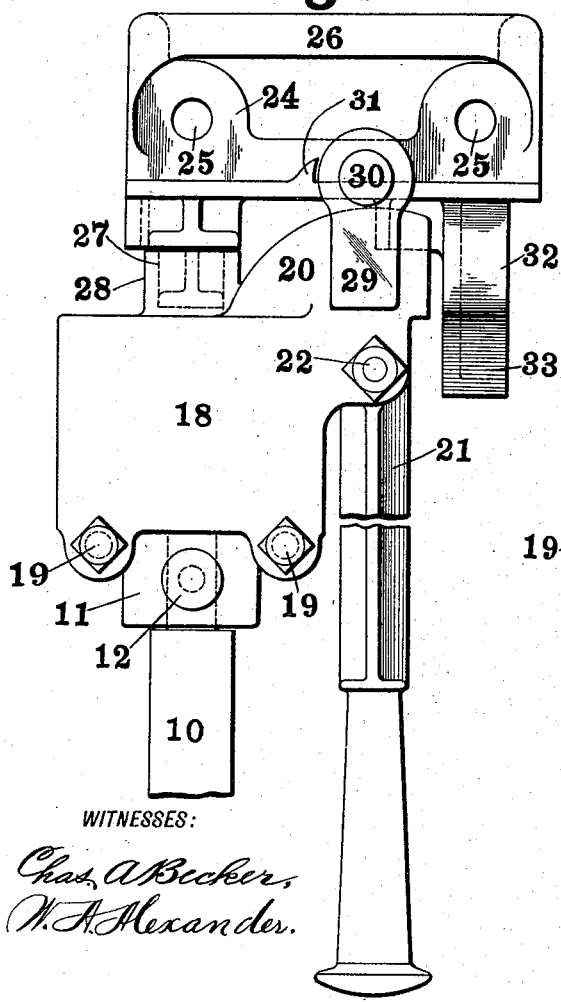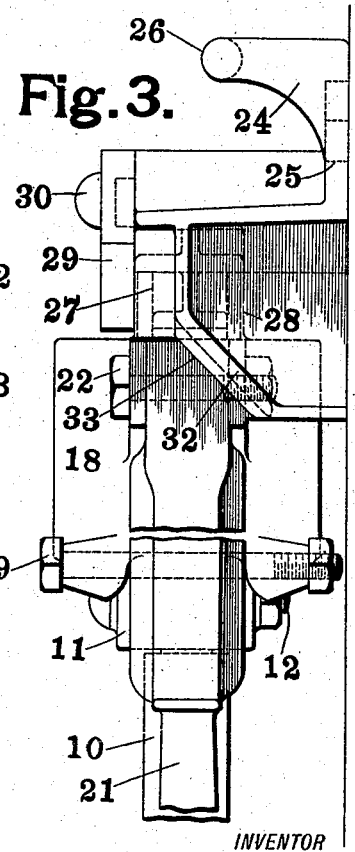
L. A. HOERR.
BRAKE MECHANISM.
APPLICATION FILED DEC. 18, 1913.
1,167,068.
Patented Jan. 4, 1916.
2 SHEETS—SHEET 1.
Fig. 1.
Fig. 2.
Fig. 3.
Fig. 4.
Fig. 5.
WITNESSES:
Chas. A. Becker,
W. H. Alexander.
INVENTOR
Louis A. Hoerr,
BY
E. E. Huffman
ATTORNEY

1,167,068.

Patented Jan. 4, 1916.
2 SHEETS—SHEET 2.

WITNESSES:
Chas. A. Becker
W. H. Alexander

INVENTOR
Louis A. Hoerr,
BY
E. E. Huffman
ATTORNEY

UNITED STATES PATENT OFFICE.

LOUIS A. HOERR, OF ST. LOUIS, MISSOURI.

BRAKE MECHANISM.

1,167,068.  Specification of Letters Patent.  Patented Jan. 4, 1916.

Application filed December 18, 1913. Serial No. 807,413.

*To all whom it may concern:*

Be it known that I, LOUIS A. HOERR, a citizen of the United States of America, residing at the city of St. Louis, State of Missouri, have invented a certain new and useful Brake Mechanism, of which the following is such a full, clear, and exact description as will enable any one skilled in the art to which it appertains to make and use the same, reference being had to the accompanying drawings, forming part of this specification.

My invention relates to a brake mechanism for railway cars, and, more particularly to that class of brakes known as "drop handle" brakes, in which the handle is pivoted and is adapted to be thrown into or out of operative connection with the brake staff by its movement to or from a vertical position.

Figure 6:
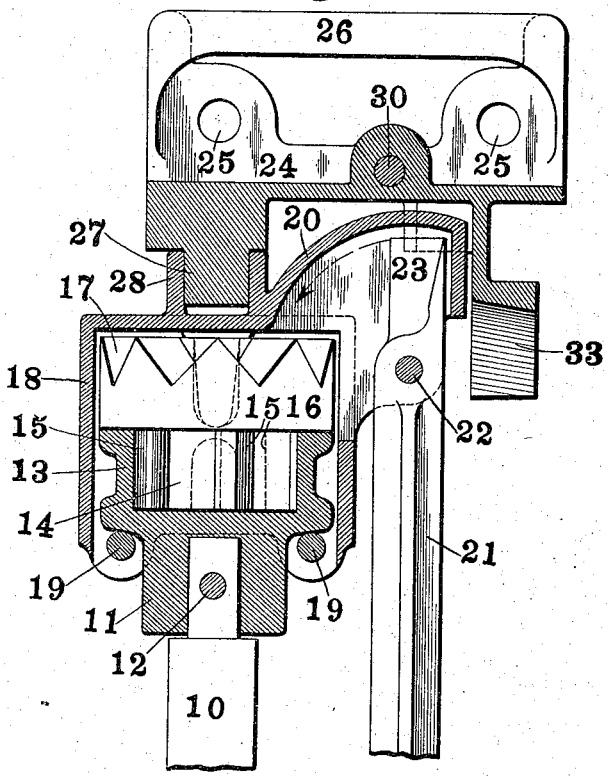
Figure 7:
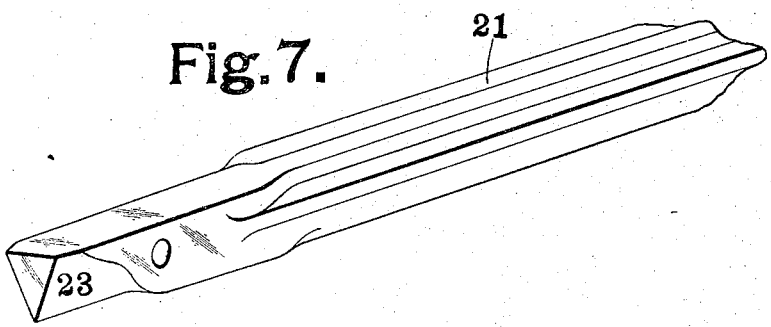

In the accompanying drawings, which illustrate one form of mechanism made in accordance with my invention, Figure 1 is a top plan view; Fig. 2 is a front elevation; Fig. 3 is a side elevation; Figs. 4 and 5 are enlarged detail views; Fig. 6 is a vertical central section; and Fig. 7 is a perspective view of the handle.

Like marks of reference refer to similar parts in the several views of the drawings.

10 represents a brake staff. The upper end of the brake staff 10 is set into a hub 11 and secured in position inside of the hub by means of a pin or bolt 12. The hub 11 is formed integral with a hollow drum 13, forming one element of a clutch device. The other element of the clutch device consists of a member 14 provided with a plurality of eccentric cam surfaces as best shown in dotted lines in Fig. 4. This member 14 projects into the hollow drum 13 and rollers 15 are interposed between the cam surfaces and the drum 13 so as to form a roller clutch which prevents relative rotation of the two parts in one direction, but allows the parts free rotative relation in the other direction. The member 14 is formed integral with a wheel 16, having formed on its upper face V-shaped radial teeth 17 which teeth are adapted to be engaged by the handle, as will be hereinafter described. Surrounding the drum 13 and wheel 16 is a housing 18. This housing 18 is held in position by means of a pair of bolts 19 which pass laterally through the lower end of the housing and engage with the lower face of the drum 13, as best shown on Fig. 6 of the drawings. The housing 18 is provided with a hood 20 in which a handle 21 is pivoted by means of a bolt 22. The inner end of the handle 21 is provided at 23 with a V-shaped tooth adapted to engage with V-shaped teeth 17 in the upper face of the wheel 16.

In all of the prior devices of this class of which I am aware, in which the handle engages directly with the wheel by a single movement in one direction only the engagement between the handle and the wheel to be actuated is such that the handle can only be thrown into operative position when it is in a certain position relative to the wheel. In my device, however, owing to the V-shaped teeth terminating in a line at their engaging edge, it is possible to move the handle into engagement with the wheel when the two parts are in any relative position whatsoever, as it will be evident that if the parts are in such position that the edge of the tooth 23 will not come into the center of the V-shaped teeth on the wheel, the engagement of the inclined faces will automatically move the wheel until the proper relative position is reached. In brake mechanisms of this class, it is desirable to have a hand hold so arranged that the operator may grasp the same with his left hand while he is operating the handle with his right hand. In my construction, I provide a bracket 24 which may be secured to the side of the car by suitable bolts passing through the bolt holes 25.

26 is a loop carried by the bracket 24 and forming the hand hold. The bracket 24 is also provided with a downwardly projecting bearing 27 which is adapted to enter a boss 28 formed on the upper face of the housing 18. In this way, the bracket 24 not only provides a hand hold but, at the same time, serves to hold the upper end of the brake staff so that it will not be bent out of alinement by the pressure exerted on the handle 21.

When the parts of the brake mechanism are not in operation, it is desirable to have some means for preventing the casing 18 and its attached handle 21 from swinging to and fro due to the motion of the car. In order to accomplish this, I provide a locking lever 29, which is secured to the bracket 24 by means of a bolt or pin 30. When this lever 29 is in the position shown in Figs. 2 and 3 of the drawings, it engages with the hood 20 of the housing 18 and thus prevents the parts from swinging to and fro. When it is desired to actuate the brake, the locking lever 29 is thrown upwardly and rearwardly so as to free the housing 18. A stop 31 limits the upward and backward movement of the lever 29.

In all of the brake mechanisms of this class heretofore used, so far as I am aware, the engagement between the handle and the staff has been through the surfaces substantially at right angles to the movements of the handle, in consequence of which a clamping effect has resulted, such that, when the handle is released, it is either thrown violently against the end of the car, or, in constructions where the end of the car is not in the path of the handle, it is liable to be thrown entirely around and so injure the operator. In the present construction, the inclined form of the teeth 17 and 23 perform the additional function of allowing the handle to drop entirely out of engagement with the wheel by its own weight when it is released. In case, however, that this does not occur, I provide positive means for causing the disengagement of the handle from the wheel, such means consisting of a downwardly projecting portion 32 carried by the bracket 24 and provided with an inclined face 33 arranged in the path of the handle so that when the handle reaches the limit of its movement, if it does not become disengaged from the wheel by its own weight, it will strike said face and be forced downwardly out of engagement with the wheel.

The operation of my mechanism will be evident. When it is desired to apply the brake, the locking lever 29 is thrown upwardly and rearwardly so as to free the casing 18 and the handle 21 is raised into a horizontal position so as to cause the V-shaped tooth 23 on its end to engage with one of the V-shaped teeth in the upper face of the wheel 16. As has been hereinbefore pointed out, this can be done regardless of the relative position of the handle and the wheel. The handle is now moved backward and forward so as to rotate the staff 10. It will be understood that the staff 10 is prevented from rotating backward by the usual ratchet mechanism, not shown. When it is desired to release the brake mechanism, it is merely necessary to release the usual ratchet mechanism and release the handle 21. If the handle 21 does not drop out of engagement with the wheel of its own weight, it will be positively released by striking the face 33.

It will be evident that there is little or no wear on the teeth of the wheel 16 as they do not perform the function of the ratchet, but are merely engaged and disengaged at the beginning or end of the operation of applying the brake. The roller clutch mechanism is such that it will positively prevent relative rotation of the wheel and brake staff in more than one direction, even after the rollers 16 have become greatly worn. It is also evident that the housing 18 protects the operating parts of the device both from the weather and from the entry of foreign matter of any kind which might interfere with its proper operation.

Having fully described my invention, what I claim as new and desire to secure by Letters Patent of the United States is:

1. In a brake mechanism, the combination with a brake staff, of a wheel for actuating said staff, and an operative handle movable by a single continuous movement through an angle of substantially 90° to establish operative connection directly between it and the wheel, the engaging surfaces connecting the handle and the wheel being so arranged as to move into operative position as the handle moves to operative position regardless of the relative position of the surfaces when disengaged.

2. In a brake mechanism for railway cars, the combination with a brake staff, of a toothed wheel for actuating said staff, and a pivoted operative handle adapted to engage directly with the wheel by a pivotal movement of the handle through an angle of substantially 90°, the coöperative surfaces of said handle and wheel being so arranged as to be capable of being brought into engagement with any relative position of the wheel and handle.

3. In a brake mechanism for railway cars, the combination with a brake staff, of a toothed wheel for actuating said staff and provided on its face with upwardly projected teeth, and a lever having an end adapted to be moved into engagement with the teeth on the said wheel by a movement through an angle of substantially 90°.

4. In a brake mechanism for railway cars, the combination with a brake staff, of a wheel for actuating said staff and provided with upwardly extending V-shaped teeth, and a lever having a V-shaped end adapted to be moved into and out of engagement with the teeth of said wheel.

5. In a brake mechanism for railway cars, the combination with a brake staff, of a wheel for actuating said staff, said wheel being provided on its face with teeth, the sides of which are inclined in opposite directions to a transverse horizontal plane passing through the axis of the staff, said sides intersecting in said plane.

6. In a brake mechanism for railway cars, the combination with a brake staff, of a wheel for actuating said staff, an operating handle adapted to be moved into and out of engagement with said wheel, and a housing carrying said handle, said housing having an imperforate top covering said wheel and the inner end of said handle.

7. In a brake mechanism for railway cars, the combination with a brake staff, of a wheel for actuating said staff and having upwardly projecting teeth the sides of which are inclined in opposite directions, a housing surrounding said wheel, and an operating handle pivotally mounted in said housing and having its inner end covered thereby, said handle having a V-shaped end adapted to be moved into and out engagement with the teeth of said wheel.

8. In a brake mechanism for railway cars, the combination with a brake staff, of a wheel for actuating said staff and having a connection therewith whereby the said parts are capable of relative rotation in one direction only, a housing surrounding said wheel, an operating handle carried by said housing, and means for locking said housing against rotation.

9. In a brake mechanism for railway cars, the combination with a brake staff, of a wheel for actuating said staff, a housing surrounding said wheel, an operating handle carried by said housing, a bracket forming a bearing for holding the upper part of said staff in alinement, and means carried by said bracket for locking said housing against rotation.

10. In a brake mechanism for railway cars, the combination with a brake staff, of a wheel for actuating said staff, a pivoted handle adapted to be thrown into and out of operation with said wheel, and automatic means for throwing said handle out of operative connection with said wheel when said handle has reached the limit of its movement.

11. In a brake mechanism for railway cars, the combination with a brake staff, of a wheel for actuating said staff, a pivoted operating handle adapted to be thrown into and out of engagement with the teeth of said wheel, and an inclined face in the path of said handle whereby said handle is automatically disengaged from said wheel when it reaches the limit of its movement.

12. In a brake mechanism for railway cars, the combination with a brake staff, of a wheel for actuating said staff, a pivoted handle adapted to be thrown into and out of operative connection with said wheel, a bracket forming a bearing for holding the upper end of the staff in alinement, and a cam carried by said bracket for automatically disengaging said handle from said wheel.

13. In a brake mechanism for railway cars, the combination with a brake staff, of a toothed wheel for actuating said staff, a pivoted handle adapted to be thrown into and out of operative engagement with said teeth on said wheel, the coöperating faces of said wheel and handle being inclined to the path of travel, and a cam in the path of said handle for automaticaly disengaging the same from the teeth of said wheel.

14. In a brake mechanism for railway cars, the combination with a brake staff, of a wheel for actuating said staff, a housing surrounding said wheel, a pivoted handle carried by said housing and having a face adapted to be thrown into and out of engagement with the teeth of said wheel, the coöperating faces of said wheel and handle being inclined to the path of travel, a bracket forming a bearing for said housing, and a cam carried by said bracket in the path of said handle whereby said handle is automatically disengaged from said wheel.

15. In a brake mechanism for railway cars, the combination with a brake staff, of a wheel for actuating said staff, an operating handle for said wheel, and a hand-hold bracket secured to the car, said bracket serving as a bearing to hold the upper end of the staff in alinement.

16. In a brake mechanism for railway cars, the combination with a brake staff, of a wheel for actuating said staff, a housing surrounding said wheel, an operating handle for said wheel carried by said housing, and a hand-hold bracket secured to the car, said bracket forming a bearing engaging said housing to hold the upper end of the staff in alinement.

17. In a brake mechanism for railway cars, the combination with a brake staff, of a toothed wheel for actuating said staff, said wheel having a clutch engagement with said staff whereby said parts are capable of relative movement in one direction only, a housing surrounding said wheel, a pivoted handle carried by said housing and adapted to be thrown into and out of engagement with said wheel, and a hand-hold bracket forming a bearing on said housing to hold the upper end of the staff in alinement.

18. In a brake mechanism for railway cars, the combination with a brake staff, of a toothed wheel for actuating said staff, said wheel having a clutch engagement with said staff, whereby the said parts are capable of relative movement in one direction, a housing surrounding said wheel, a pivoted handle carried by said housing and adapted to be thrown into and out of engagement with said wheel, a hand-hold bracket carried by the car and forming a bearing for the housing to hold the upper part of the staff in alinement, locking means carried by said bracket for holding said housing against rotation, and a cam carried by said bracket in the path of said handle whereby said handle is automatically disengaged from said wheel.

In testimony whereof, I have hereunto set my hand and affixed my seal in the presence of the two subscribing witnesses.

LOUIS A. HOERR. [L. S.]

Witnesses:
W. A. ALEXANDER,
G. M. SHORE.

Copies of this patent may be obtained for five cents each, by addressing the "Commissioner of Patents, Washington, D. C."